United States Patent

[11] 3,540,546

[72] Inventor Thomas C. Dark
Omaha, Nebraska (1724 Four Mile Drive
Apt. 1-C., Williamsport, Pa. 17701)

[21] Appl. No. 882,825
[22] Filed Dec. 8, 1969
[45] Patented Nov. 17, 1970

[54] TELEPHONE SILENCER
8 Claims, 6 Drawing Figs.

[52] U.S. Cl. .......... 181/33, 181/34

[51] Int. Cl. .......... F01n 7/00; H04m 1/19

[50] Field of Search .......... 181/18, 21, 33, 34, 33.05, 33.4

[56] References Cited

UNITED STATES PATENTS

| | | | |
|---|---|---|---|
| 660,796 | 10/1900 | Hoglund et al. | 181/21UX |
| 1,800,234 | 4/1931 | Tuttle | 181/34 |
| 2,425,061 | 8/1947 | Hart | 181/21UX |
| 2,590,481 | 3/1952 | Vogel | 181/21UX |

*Primary Examiner*—Robert S. Ward, Jr.
*Attorney*—Willard J. Hodges, Jr.

ABSTRACT: A silencer holder for a telephone hand set having a recess which receives, encases and shields the transmitter mouthpiece from ambiant sound. The components of the recess contacting surface closely conforms to the contour of the transmitter and may include a soft resilient contact surface. The base of the device may be of a spherical rocking contour, or a wall mount for supporting and shielding the hand set from ambient sound.

Patented Nov. 17, 1970 3,540,546

INVENTOR

THOMAS C. DARK

BY Wilbert J. Hodges, Jr.

ATTORNEY

TELEPHONE SILENCER

A need exists for an effective means to shield the telephone transmitter from background sound for privacy or security reasons. One of the common practices is to cover the transmitter mouthpiece with the hand. This is not always possible or convenient. The device of this invention permits leaving the phone for adjacent areas or examining files requiring use of both hands. Adjacent ambient sound is effectively shielded or blocked from the transmitter while the instrument is ostensibly not in use.

The preferred embodiment of the device is a desk model comprising a base having a recess which encases the telephone transmitter in close engaging contact effectively shielding and sealing out ambient sound. The base has a spherical rocking contour surface which contact is the desk or table surface supporting the hand set at any angle.

The second embodiment is designed for wall use. The contour and construction and configuration of the recess is identical with the desk type referred to above. The outer configuration of the base, however, substantially differs in that provision is made for securing the device to the wall and may include a downward projecting wall shield.

Devices for related use are known to the prior art some of which have been patented. The disadvantages of many of the previous concepts are that they are complicated, costly to construct and awkward to use. One of the objects of the design of this invention was to provide a device of relatively inexpensive, one-piece construction having no moving parts which would effectively shield a transmitter from ambient sound.

Another object was to design a device which could be constructed inexpensively from plastics by widely used molding and extrusion methods of manufacture.

Other objects and advantages will be apparent to those skilled in the art from the study of the attached several views and the following description.

Figure 1:
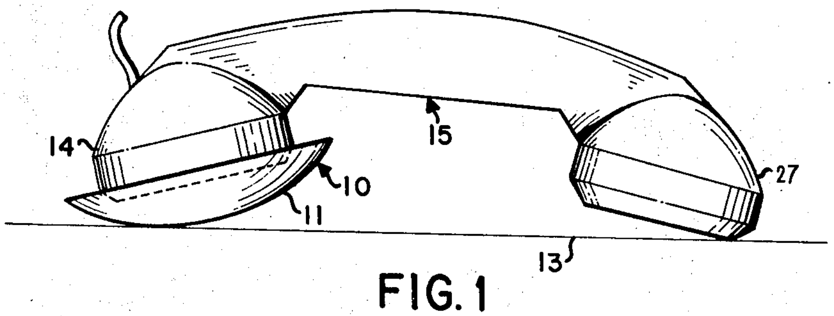
FIG. 1 is a side perspective view of the preferred desk species of the device in use on a flat surface with an associated telephone handset.

For description of the construction and use of the device of this invention, reference is made to the foregoing several views and the following detailed descriptions wherein identical reference characters will be used to refer to identical or equivalent components throughout the several views and the description.

Figure 2:
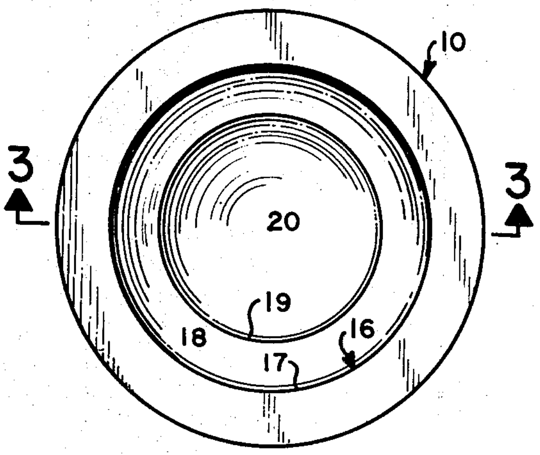
FIG. 2 is a top view of the desk species of the device suggesting some details of the contours of the recess.
Figure 3:
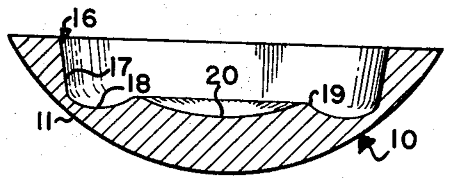
FIG. 3 is a side view of the device taken on line 3–3 of FIG. 2 looking in the direction of the arrows suggesting a unitary construction.
Figure 4:
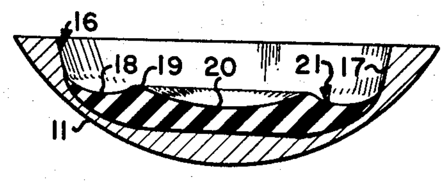
FIG. 4 is also a sectional view of the device taken on line 3–3 of FIG. 2 looking in the direction of the arrows suggesting an integrated soft, resilient contact surface.

Particular reference is made to FIGS. 1, 2 and 3. The desk model of the device has a main body 10 which may be constructed or molded of a wide variety of plastics by molding or extrusion means of manufacture well known to the art. Plastics such as polyvinylchloride, polystyrene, poly-urethane, or any number of acrilics or resins could be used. A composition using a combination of bonded material may also be employed. This invention does not pertain to molding techniques but to the contours and configurations of the device. The main body 10 of the desk model has a base 11 which is constructed with spherical rocking contour 12 which can contact any flat surface of a table or desk 13 and support and protect from ambient sound transmitter 14 of a telephone hand set 15 at any angle. The base 11 is constructed with a recess 16 having circumferential sidewalls 17 which conform to the contour of the outer dimensions of the circumference of the telephone transmitter 14. Adjacent the circumferential sidewall 17 is constructed a concave ring 18 which terminates inward in a convex peak 19. In the center of the recess 16 is constructed a concave central sphere 20.

The foregoing detail construction and configuration enables the telephone transmitter 14 to be supported and sealed in the recess 16 thereby excluding all external ambient sound. The foregoing construction might be relatively rigid and effectively shield the transmitter 14. An additional improvement which may be incorporated in the device would be the construction wherein those portions of the recess 16 adjacent the concave central sphere 20 comprises a soft, resilient contact cushion 21.

Figure 5:
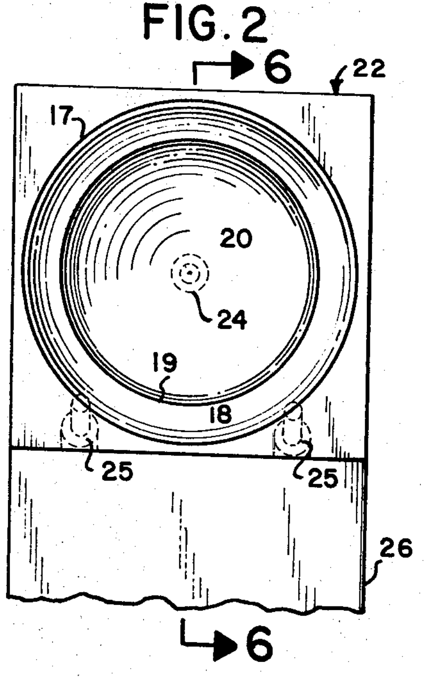
FIG. 5 is a front elevation view partially fragmented of the wall type species of the device.
Figure 6:
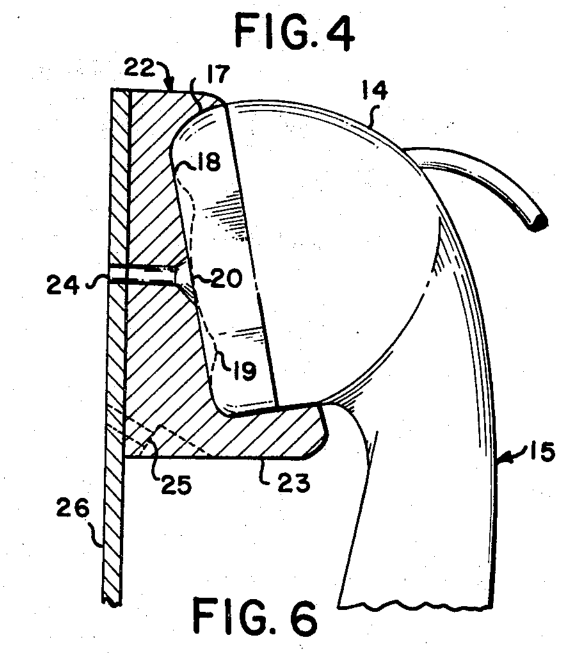
FIG. 6 is a sectional view partially fragmented of the wall type species of the device taken substantially on line 6–6 of FIG. 5 looking at the directions of arrows, also illustrated is the associated telephone hand set.

For description of the wall mounted species of the device reference is particularly made to FIGS. 5 and 6. In this version of the device, the outer configuration of the body portion 10 and base 11 may comprise relatively flat surfaces. The wall mounting base 22 should be constructed with an elongated lower lip 23 to securely support the telephone transmitter 14. The wall mounting base 22 may be secured to the surface of a wall by a variety of means. A central mounting screw 24 and two diagonal mounting screws 25 are illustrated. The device may include as an integral structure projecting downward from the wall mounting base 22 a wall shield 26. This wall shield 26 is designed to support the receiver 27 of the hand set 15. It is suspended from the wall as illustrated in FIG. 6. The purpose of the wall shield 26 is to protect the receiver 27 from contact with the wall.

The internal construction of base 11 of the wall mounted species is identical with a desk model previously described. The wall version may be constructed to include a circumferential side wall 17, concave ring 18, the convex circle 19, a concave central sphere 20 and might well embody a soft resilient contact cushion 21.

Flat noncontoured surfaces or configurations which do not securely receive and seal the transmitter from ambient sound are not acceptable within the concepts of this device.

In use, the desk species of the device may be left on a table or desk 13 adjacent the telephone 15. If the person using the phone desires to momentarily leave the phone, he need merely rest the phone transmitter 14 in the recess 16 of the device. The configuration of the spherical rocking contour 12 of the base 11 permits the device to assume an angle which effectively supports the telephone 15 and seals the transmitter 14 excluding ambient sound. The function of the wall type version is comparable. Having described in detail the construction use of my invention in two species, what is desired to be claimed is all modifications or equivalent structures not departing from the spirit or scope of the invention as defined by the appended claims.

I claim:

1. The silencer holder for a telephone transmitter comprising:

a. a body portion;

b. said body portion including a circumferential sidewall defining a substantially cylindrical recess capable of receiving a telephone transmitter;

c. a concave ring adjacent and projecting radially inward from said circumferential sidewall; and d. a concave central spherical member constructed at substantially the center of said structure defined by said circumferential sidewalls and said concave ring.

2. The invention of claim 1 including a convex peaked circle at the juncture of said concave ring and said concave central spherical member.

3. The invention of claim 1 wherein said body portion includes a spherical rocking contoured base constructed to rockingly contact a flat surface at infinite angles of displacement.

4. The invention of claim 1 wherein said concave central spherical member comprises a soft, resilient contact cushion.

5. The invention of claim 1 wherein the main body portion includes a substantially flat wall mount base.

6. The invention of claim 5 wherein the main body portion includes a wall shield projecting parallel to said wall mount base.

7. The invention of claim 1 wherein the said concave ring and said concave central spherical member comprises a soft, resilient contact cushion.

8. The invention of claim 2 wherein the said convex peaked circle comprises a soft, resilient contact cushion.